No. 666,851. Patented Jan. 29, 1901.
J. LANZ.
METHOD OF MAKING ARTICLES OF VARYING CROSS SECTION.
(Application filed Sept. 21, 1900.)
(No Model.) 2 Sheets—Sheet 1.
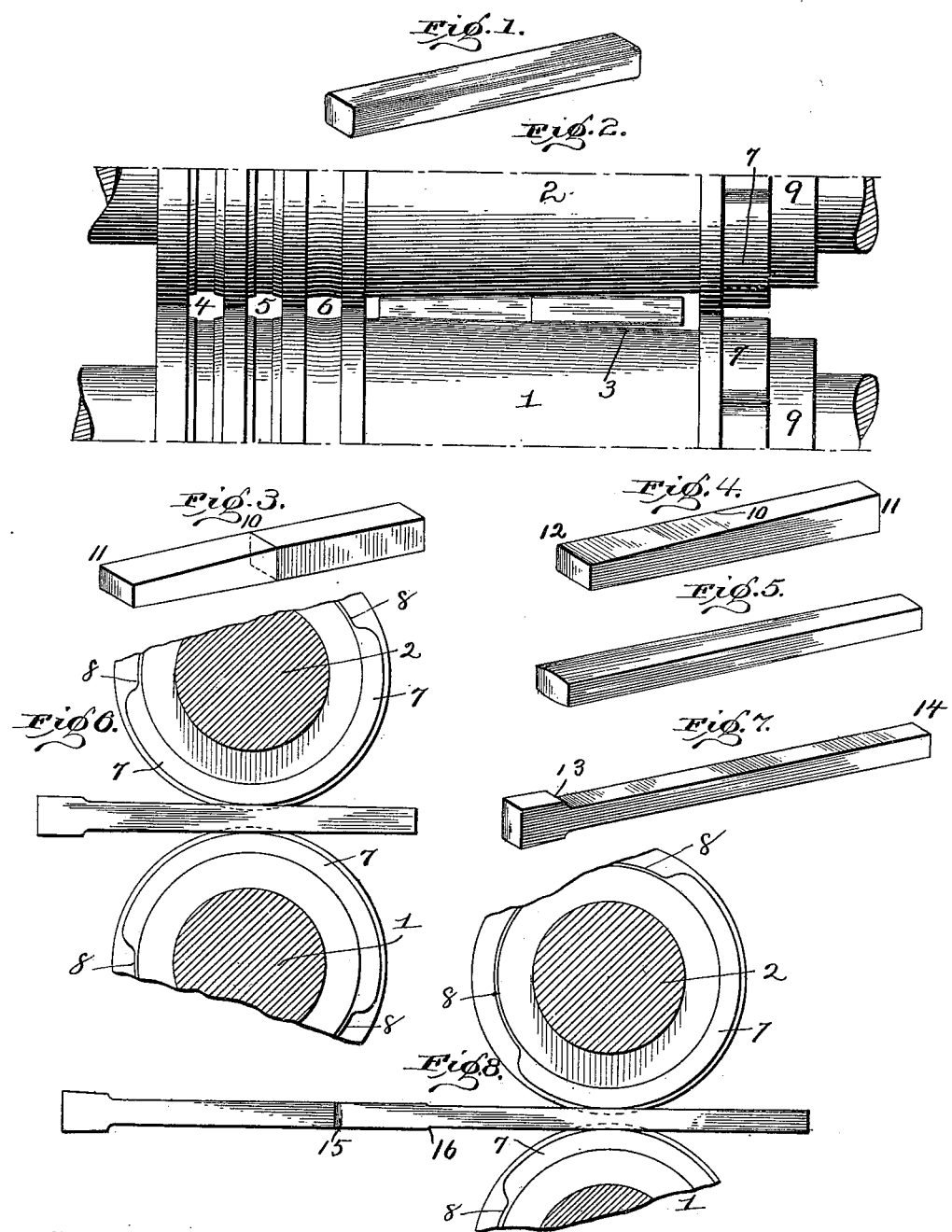

No. 666,851. Patented Jan. 29, 1901.
J. LANZ.
METHOD OF MAKING ARTICLES OF VARYING CROSS SECTIONS.
(Application filed Sept. 21, 1900.)
(No Model.) 2 Sheets—Sheet 2.
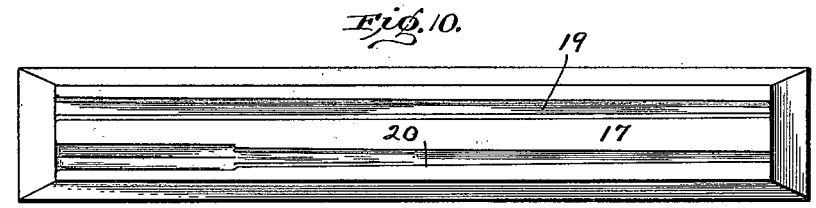
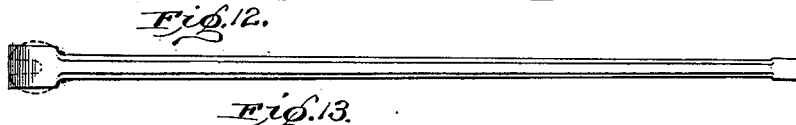
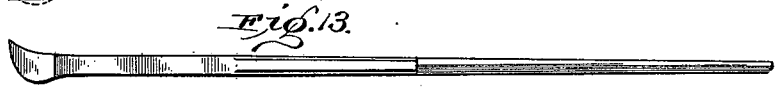
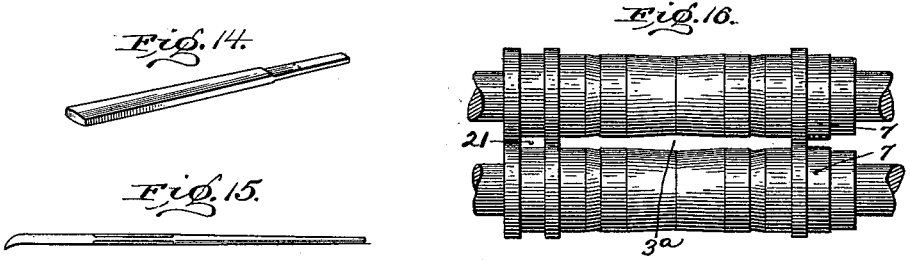
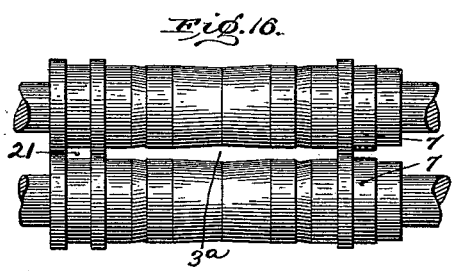
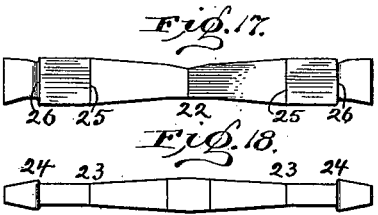
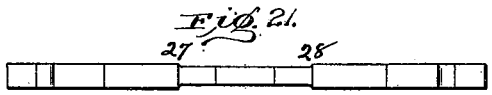
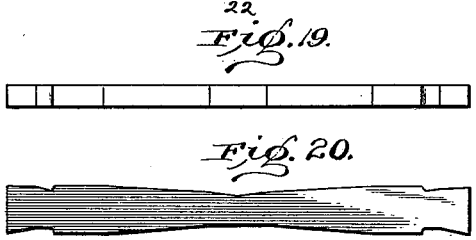
Witnesses.
Walter Famariss
Fred D Sweet
Inventor:
John Lanz
By Kay & Totten
Attorneys.
THE NORRIS PETERS CO., PHOTO-LITHO., WASHINGTON, D. C.

UNITED STATES PATENT OFFICE.

JOHN LANZ, OF PITTSBURG, PENNSYLVANIA.

METHOD OF MAKING ARTICLES OF VARYING CROSS-SECTION.

SPECIFICATION forming part of Letters Patent No. 666,851, dated January 29, 1901.

Application filed September 21, 1900. Serial No. 30,651. (No model.)

*To all whom it may concern:*

Be it known that I, JOHN LANZ, a resident of Pittsburg, in the county of Allegheny and State of Pennsylvania, have invented a new and useful Improvement in Methods of Making Articles of Varying Cross-Section; and I do hereby declare the following to be a full, clear, and exact description thereof.

My invention relates to a method of manufacturing metal articles which have a varying cross-section longitudinally—such, for example, as crowbars, spike-pullers, car-axles, &c.; and it has for its object to provide a method of forming such articles from a blank or ordinary bloom or billet which is substantially square in cross-section, which method may be carried into effect in most of its steps by circular rolls or projecting circular working faces, whereby it can be inexpensively and expeditiously practiced and the result of which shall be an article that is symmetrical in form and of uniform density or homogeneous in composition.

In the accompanying drawings I have illustrated suitable means for practicing my invention and indicated the various steps by which the blank is treated in the practice of my method.

In the drawings, Figure 1 is a perspective view of the billet or bloom before treating by my process. Fig. 2 is a front elevation of a portion of a pair of rolls or the working faces which may be used in carrying out my process. Fig. 3 is a perspective view of the blank after the first side pass through said rolls. Fig. 4 is a similar view after the second side pass through the rolls. Fig. 5 is a perspective view of the blank after being longitudinally rolled. Fig. 6 is a cross-section of the rolls, showing the action of the projecting circular working faces on the blank. Fig. 7 is a perspective view of the blank after its second pass between the projecting circular working faces of the rolls. Fig. 8 is a cross-section of the rolls and blank, illustrating the manner in which the blank is further reduced by the projecting circular faces. Fig. 9 is a perspective view of the blank after it is finished in the rolls. Fig. 10 is a plan view of one of the dies in which the article is compressed to final form. Fig. 11 is an end view of the dies. Fig. 12 is a plan view of the blank after the first compression in the dies. Fig. 13 is a side view of the blank after the second compression in the dies. Fig. 14 is a perspective view of a blank as shown in Fig. 5 reduced in the projecting circular faces of the rolls preparatory to forming a crowbar. Fig. 15 is a side view of the finished crowbar. Fig. 16 is a front elevation of a pair of rolls suitable for forming a blank for a car-axle. Fig. 17 is a plan view of the blank after being passed sidewise through the main pass of said rolls. Fig. 18 is an edge view of the same. Fig. 19 is an edge view of the blank shown in Figs. 17 and 18 after being rolled longitudinally. Fig. 20 is a plan view of the same. Fig. 21 is an edge view of the blank shown in Figs. 18 and 19 having its middle portion reduced by the projecting circular faces of the rolls. Fig. 22 is a plan view of the same, and Fig. 23 is a side view of the finished axle.

Figs. 1 to 13, inclusive, illustrate a method of forming a spike-puller, and the rolls employed in carrying out this method are shown in Fig. 2, said rolls comprising a lower roll 1 and an upper roll 2, said rolls having their main body portions tapered to form the pass 3, which preferably tapers from end to end. To the left of this main pass the rolls are provided with passes 4, 5, and 6, which are adapted to roll the blank longitudinally and gradually reduce it to the proper shape. To the right of the main pass 3 the rolls are provided with the projecting circular working faces 7, said faces being concentric and extending a portion only of the distance around said rolls, which are cut away at 8, as shown in Figs. 6 and 8. Beyond the projecting faces 7 the rolls are provided with the concentric portions 9. These rolls will be mounted in suitable housings provided with means whereby the top roll may be quickly adjusted relatively to the lower roll, and said rolls are driven in any suitable manner.

In the practice of the invention I start, preferably, with a square billet or bloom of suitable length and weight, such as shown in Fig. 1. The rolls 1 and 2 are adjusted so that the space between said rolls at the middle portion of the pass 3 is substantially equal to the thickness of the billet or bloom, and the latter after being properly heated is passed sidewise through the pass 3, whereby it is tapered from the point 10 to the end 11, as shown in Fig. 3, and is flattened sidewise at the end 11. The rolls are then preferably revolved in the opposite direction and the blank is turned end for end and given a quarter-turn and passed sidewise back through the pass 3, whereby the opposite end of the blank is tapered from the point 10 to the end 12 and the end 12 is flattened sidewise, said flattened end standing at right angles to the flattened end 11, as shown in Fig. 4. The blank is then passed endwise through any or all the passes 4, 5, and 6 in succession and in the order named, preferably in the same direction. It will be observed that the main pass of the rolls is of such outline as to receive the blank bodily and sidewise, so that said rolls cause the metal in the blank to flow sidewise therein; but since said rolls contact with the blank throughout its entire length or that portion thereof which is to be spread they cause substantially no end flow of the metal in the blank, so that the latter remains of substantially the same length, while the ends of the blank are spread and the blank is provided with tapers or protuberances, which are subsequently rolled off in the passes 4, 5, and 6. The treatment in the passes 4, 5, and 6, or either of them, however, subjects the blank to a longitudinal rolling compression, whereby end flow of the metal results, thereby causing the blank to be elongated, but side flow being prevented. The blank while still at a rolling heat is then passed between the rolls at the right-hand end and allowed to rest upon the concentric portion 9, and when the cut-away portions 8 of the rolls are opposite each other the blank is moved sidewise toward the left, so that in the further rotation of the rolls the blank will be compressed between the projecting circular faces 7 and gradually reduced, as indicated in Fig. 6. Two or more passes, as necessary, are given to the blank in this way until the same is reduced to substantially the proportions indicated in Fig. 7, wherein the blank is reduced from approximately the point 13 to the end 14 of the blank. The rolls are then adjusted closer together, and the blank is given a quarter-turn and again subjected to the compressing action of the projecting circular faces 7, but only from the point 15 to the end 14 of the bar. The blank is then again given a quarter-turn and again subjected to the action of the projecting circular faces, but for a still shorter distance, as from the point 16, and this turn of the blank through a quarter-turning and subjecting it to the action of the projecting circular faces 7 is continued, each rolling being applied to a shorter length than the preceding one and the rolls being adjusted closer together after each pass until the blank is reduced to substantially a taper or the form indicated in Fig. 9. All of these steps are carried on at a single heat of the billet or bloom and can be performed expeditiously and therefore inexpensively. The pass 3 could be made with a straight outline—that is, without taper—and a square billet of proper weight and comparatively short length may be reduced to a blank having a cross-section equal to the largest end of the blank shown in Fig. 9, and this blank can then be tapered by the projecting surfaces 7, as above described; but this will take more time than if the billet is first reduced to the form shown in Fig. 4, and especially so if a blank such as shown in Fig. 14 is desired. The blank is then compressed between the dies 17 and 18, said dies being provided with two die-cavities 19 and 20, respectively, in the first of which the blank is reduced to the form shown in Fig. 12, after which it is transferred to the second die-cavity and reduced to the form shown in Fig. 13, with the exception that the upturned end shown in said figure is afterward forged on by hand-hammering or other suitable manner.

In case it is desired to form a crowbar, the billet is reduced to the form shown in Fig. 5 and is then subjected to the action of the projecting circular faces 7 on the rolls and is reduced on its parallel sides to the shape shown in Fig. 14, after which it is transferred to a press having suitable die-cavities in which it is given final form, as shown in Fig. 15, except the point, which is formed by any convenient means.

For forming railroad-car axles the rolls are given the shape shown in Fig. 16, in which the main pass 3ª is not tapering from end to end, but has a general tapering direction from the middle toward both ends, and the rolls are provided with suitable annular tapers or protuberances thereon to form the desired depressions in the blank. To the left of this main pass 3ª is a single pass 21, and to the right of the pass 3ª are the circular projecting working faces 7, as in the other former rolls. The heated billet or bloom is first passed sidewise through the main pass 3ª and is then returned through the same, whereby it is given approximately the shape shown in Figs. 17 and 18, the same being gradually tapered from the middle 22 in both directions to the point 23, from which point it continues of substantially the same thickness to the shoulder 24. This tapering from the point 22 to the point 23 and reduction of the portion between the points 23 and 24 produce a corresponding widening of the blank when viewed in plan from the middle portion 22 to the point 25, from which point it continues of the same width to the point 26, when it again becomes narrower, so that the cross-section area of said blank is substantially the same at all points. The blank is then passed endwise through the pass 21, which reduces the blank and causes the greatest elongation at points of the highest protuberances, but produces practically no side flow, since the metal flows in the direction of its rolling or reduction, whereby the blank is reduced to substantially a uniform thickness from end to end, but with a varying cross-section area at different points in its length, as shown in Fig. 19, and having an edge outline, as shown in Fig. 20. The blank may then be transferred to the right-hand end of the rolls, and the middle portion thereof from the point 27 to the point 28 is rolled between the projecting circular working faces 7, and this is continued until the projections release the blank, thereby causing a still further elongation of a portion of the blank, but no side flow. The blank is then transferred to a press having axle-shaped die-cavities, in which it is formed to its final shape, as shown in Fig. 23.

Ordinarily the contact of the rolls with a considerable portion of the blank or the irregularities of the rolls are sufficient to prevent end flow of the metal in the blank during the sidewise rolling. In case, however, the blank is to be provided with deep depressions at its end by suitable annular projections on the rolls it will be found necessary to provide the rolls with suitable collars, against which the ends of the blank contact, whereby end flow of the metal is prevented.

In the case of articles of short length the contour of the working faces forming the main pass of the rolls will be so formed that in the sidewise rolling a multiple blank is formed—that is, one which is adapted to be formed into a plurality of articles. The multiple blank is then rolled longitudinally, after which it is transferred to a press having die-cavities, which form the blank into a plurality of articles simultaneously.

In each case the billet or bloom may be of an ordinary cross-section, such as are generally rolled in standard sizes, and as the initial steps are all rolling ones the method can be practiced expeditiously and at a comparatively low temperature, besides making it practicable to work the higher and harder grades of steel. Furthermore, the first shaping of the billet or bloom by means of rolling rather than by compressing or hammering requires much less power and machinery than if the same were pressed or hammered and can be performed with ordinary rolling-mill machinery. Furthermore, the final shaping of the blanks by means of a press in the manner set forth enables me to produce articles of great and of substantially uniform density and of smooth and symmetrical form, whereas the shaping by means of hammering involves the expenditure of much more time and produces uneven surfaces, and besides the resulting article, such as a large car-axle, is not of uniform density throughout.

I do not wish to be limited to the precise form and construction of rolls shown, as the several passes will be designed to conform to the shape of the blank for the article to be manufactured, and said passes need not all be formed in the same roll nor in the same stand, but may be in separate rolls or separate stands. Furthermore, a billet or blank longer than the length of the main pass may be used by entering said blank or billet into the main pass at a sufficient angle to the axes of the rolls, so that it will pass between the ends of said main pass.

What I claim, and desire to secure by Letters Patent, is—

1. The improvement in the art of forming metal articles of longitudinally-varying cross-section which consists in subjecting a heated metal blank, billet or bloom to a rolling pressure applied one or more times sidewise to said billet or bloom in such a manner as to effect simultaneously varying degrees of side flow and prevent end flow of the metal, and thereby produce depressions or tapers in the sides of the blank, and corresponding protuberances, swells or tapers in the edge or edges thereof and then subjecting said blank to a rolling pressure applied longitudinally and progressively from end to end, whereby the blank is elongated without materially changing its width or the contour of its edges.

2. The improvement in the art of forming metal articles of longitudinally-varying cross-section which consists in subjecting a heated metal blank, billet, or bloom to a rolling pressure applied sidewise to said blank, billet or bloom and simultaneously from end to end thereof, in such a manner as to effect varying degrees of side flow and prevent end flow of the metal, and thereby produce depressions or tapers in the sides and corresponding protuberances, swells or tapers in one of the edges of the blank, then subjecting the blank to a similar rolling pressure in a similar manner to produce corresponding protuberances, swells or tapers in another edge of said blank, and then subjecting said blank to a rolling pressure applied longitudinally and progressively from end to end whereby the blank is elongated without materially changing its width or the contour of its edges.

3. The improvement in the art of forming metal articles of longitudinally-varying cross-section which consists in subjecting a heated metal blank, billet or bloom of uniform size throughout to a rolling pressure applied sidewise to said blank, billet or bloom in such a manner as to effect simultaneously varying degrees of side flow and prevent end flow of the metal, and thereby produce depressions or tapers in the sides and corresponding protuberances, swells or tapers in the edges of said blank, then subjecting said blank to a rolling pressure applied longitudinally and progressively from end to end, whereby the blank is elongated without materially changing its width or the contour of its edges, and then compressing the blank into final form.

4. The improvement in the art of forming metal articles of longitudinally-varying cross-section, which consists in subjecting a heated metal blank, section of bar, billet or bloom to laterally-applied pressure in such a manner as to effect side flow and substantially no end flow of the metal, and producing depressions or tapers in the sides and corresponding protuberances, swells or tapers in the edges of said blank, then subjecting said blank to a rolling pressure applied longitudinally and progressively from end to end, whereby the blank is elongated without materially changing its width, and then subjecting the blank to a rolling compression applied longitudinally and progressively to a portion only of the length of the blank, whereby the blank is further elongated and reduced at that portion without materially changing its width.

5. The improvement in the art of forming metal articles of longitudinally-varying cross-section, which consists in subjecting a heated metal blank, billet or bloom to a rolling pressure applied sidewise of said bloom, and substantially to one half the length thereof, whereby the blank is spread sidewise without materially changing its length, and is provided with depressions or tapers on its sides and corresponding protuberances, swells or tapers on its edges, then giving the blank a quarter-turn and subjecting the other half of the blank to a like rolling action in a similar manner, whereby the swells or tapers on one half of said blank are at right angles to those on the other half of said blank, and then subjecting said blank to a rolling pressure applied longitudinally and progressively from end to end, whereby said blank is elongated without materially changing its width.

6. The improvement in the art of forming metal articles of longitudinally-varying cross-section, which consists in subjecting a heated metal blank, billet or bloom to a rolling pressure applied sidewise of said bloom, and to substantially one half the length thereof, whereby said blank is spread sidewise without materially changing its length, and provided with depressions or tapers in its sides and corresponding protuberances, swells or tapers in its edges, then giving said blank a quarter-turn and subjecting the other half thereof to a similar rolling compression in a similar manner, whereby the swells or tapers on one half of said blank are at right angles to those on the other half of said blank, then subjecting said blank to a rolling pressure applied longitudinally and progressively from end to end, whereby it is elongated without materially changing its width, and then subjecting the blank to a further rolling compression applied longitudinally but throughout a portion of the length only of the blank, whereby that portion is reduced in thickness and elongated without materially changing its width.

7. The improvement in the art of forming metal articles of longitudinally-varying cross-section, which consists in subjecting a heated metal blank, billet or bloom to laterally-applied pressure in such a manner as to effect side flow and prevent end flow of the metal, and thereby produce depressions or tapers in the sides and corresponding protuberances, swells or tapers in the edges of said blank, then subjecting said blank to a rolling pressure applied longitudinally and progressively from end to end, whereby the blank is elongated without materially changing its width, and then subjecting the blank to a series of further rolling compressions applied longitudinally but throughout a portion only of the length of the blank, each of said last rolling compressions being applied to a less length than the preceding one, and give the blank a quarter-turn after each of said rolling compressions.

8. The improvement in the art of forming metal articles of longitudinally-varying cross-section, which consists in subjecting a heated metal blank, billet or bloom to a rolling pressure applied longitudinally and progressively to said blank, but to a portion of the length thereof only, giving said blank a quarter-turn, then subjecting it to a further rolling pressure applied longitudinally and progressively thereto but to a less length than the preceding rolling pressure, again giving said blank a quarter-turn and again subjecting it to a rolling pressure applied longitudinally and progressively but to a still lesser length thereof, and then compressing or hammering said blank into final form.

9. The improvement in the art of forming metal articles of longitudinally-varying cross-section which consists in subjecting a heated metal blank, billet or bloom of a length to form a plurality of articles to a rolling pressure applied sidewise to said billet or bloom in such a manner as to effect simultaneously varying degrees of side flow and prevent end flow of the metal, and thereby produce depressions or tapers in the sides of the blank, and corresponding protuberances, swells or tapers in the edges thereof and then subjecting said multiple blank to a rolling pressure applied longitudinally and progressively from end to end, whereby the blank is elongated without materially changing its width or the contour of its edges.

10. The improvement in the art of forming metal articles of longitudinally-varying cross-section which consists in subjecting a heated blank, billet, or bloom of a length to form a plurality of articles to a rolling pressure applied sidewise to said billet and simultaneously from end to end thereof, in such a manner as to effect varying degrees of side flow and prevent end flow of the metal, and thereby produce depressions or tapers in the sides of the blank, and corresponding protuberances, swells or tapers in the edges thereof, then subjecting said multiple blank to a rolling pressure applied longitudinally and progressively from end to end, whereby the blank is elongated without materially changing its width or the contour of its edges, and then compressing said multiple blank into the form of a plurality of articles simultaneously.

In testimony whereof I, the said JOHN LANZ, have hereunto set my hand.

JOHN LANZ.

Witnesses:
  F. W. WINTER,
  G. C. RAYMOND.